(12) United States Patent
Strain et al.

(10) Patent No.: US 9,275,096 B2
(45) Date of Patent: Mar. 1, 2016

(54) OPTIMIZED B-TREE

(75) Inventors: Owen Joseph Strain, San Francisco, CA (US); Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 13/352,256

(22) Filed: Jan. 17, 2012

(65) Prior Publication Data
US 2013/0185271 A1    Jul. 18, 2013

(51) Int. Cl.
G06F 7/00 (2006.01)
G06F 17/00 (2006.01)
G06F 17/30 (2006.01)
G06F 15/16 (2006.01)

(52) U.S. Cl.
CPC .... *G06F 17/30362* (2013.01); *G06F 17/30327* (2013.01); *G06F 17/30961* (2013.01)

(58) Field of Classification Search
CPC .............. G06F 17/30362; G06F 17/30327
USPC .................................. 707/704, 797
See application file for complete search history.

(56) References Cited

U.S. PATENT DOCUMENTS

| | | | | |
|---|---|---|---|---|
| 4,823,310 A * | 4/1989 | Grand | .................... | 707/999.008 |
| 5,333,138 A | 7/1994 | Richards et al. | | |
| 5,414,839 A * | 5/1995 | Joshi | .................... | 707/999.008 |
| 5,446,858 A * | 8/1995 | Copeland et al. | ....... | 707/999.008 |
| 5,664,096 A | 9/1997 | Ichinomiya et al. | | |
| 5,682,537 A * | 10/1997 | Davies et al. | .......... | 707/999.008 |
| 5,966,734 A | 10/1999 | Mohamed et al. | | |
| 6,105,103 A | 8/2000 | Courtright et al. | | |
| 7,117,399 B2 | 10/2006 | Song | | |
| 7,174,331 B1 * | 2/2007 | Luo et al. | ............... | 707/999.008 |
| 7,318,118 B2 | 1/2008 | Chu et al. | | |
| 7,411,757 B2 | 8/2008 | Chu et al. | | |
| 7,644,239 B2 | 1/2010 | Ergan et al. | | |
| 7,861,032 B2 | 12/2010 | Song et al. | | |
| 7,975,095 B2 | 7/2011 | Hsieh et al. | | |
| 8,151,064 B2 | 4/2012 | Lee | | |
| 8,370,558 B2 | 2/2013 | Natarajan et al. | | |
| 8,417,679 B1 * | 4/2013 | Lyle et al. | ..................... | 707/696 |
| 2005/0102255 A1 | 5/2005 | Bultman | | |

(Continued)

OTHER PUBLICATIONS

William E. Weihl and Paul Wang, "Multi-Version Memory: Software Cache Management for Concurrent B-Trees," Proceedings of the Second IEEE Symposium on Parallel and Distributed Processing, Dec. 9-13, 1990, Dallas, TX , pp. 650-655, Dec. 9, 1990.

(Continued)

*Primary Examiner* — Usmaan Saeed
*Assistant Examiner* — Brian E. Weinrich
(74) *Attorney, Agent, or Firm* — Blakely, Sokoloff, Taylor & Zafman LLP

(57) ABSTRACT

The present technology includes an optimized b-tree. To improve concurrent access, a read lock can be applied to traversed nodes of a b-tree in a lock coupling. A read locked node can be promoted to a write locked node upon a determination that the node is likely to be modified, wherein the locked node first restricts access to further functions and then applies a write lock to the node when all existing functions accessing the node end. If one of the other functions attempts to promote the later function can be canceled and removed from the tree. A node can be promoted if the node is likely to be modified when considering multiple factors such as type of function, whether it is a leaf node, the number of keys in the node, or the number of keys in a child node.

18 Claims, 5 Drawing Sheets

(56) References Cited

U.S. PATENT DOCUMENTS

| | | | |
|---|---|---|---|
| 2005/0154852 A1 | 7/2005 | Nakagawa et al. | |
| 2006/0282481 A1* | 12/2006 | Zhou et al. | 707/999.204 |
| 2007/0168602 A1 | 7/2007 | Takai et al. | |
| 2007/0168604 A1 | 7/2007 | Takai et al. | |
| 2007/0168606 A1 | 7/2007 | Takai et al. | |
| 2007/0271428 A1 | 11/2007 | Atluri | |
| 2008/0025706 A1 | 1/2008 | Yoshida et al. | |
| 2008/0077729 A1 | 3/2008 | Kim et al. | |
| 2008/0126680 A1 | 5/2008 | Lee et al. | |
| 2008/0126686 A1 | 5/2008 | Sokolov et al. | |
| 2008/0154840 A1 | 6/2008 | Rathi et al. | |
| 2008/0215800 A1 | 9/2008 | Lee et al. | |
| 2008/0244164 A1 | 10/2008 | Chang et al. | |
| 2009/0082068 A1 | 3/2009 | Sakai | |
| 2009/0138220 A1 | 5/2009 | Bell et al. | |
| 2009/0313416 A1 | 12/2009 | Nation | |
| 2010/0037017 A1 | 2/2010 | Ryu et al. | |
| 2010/0076940 A1* | 3/2010 | Bordawekar et al. | 707/704 |
| 2010/0082664 A1* | 4/2010 | Odaira | 707/769 |
| 2011/0047192 A1 | 2/2011 | Utsunomiya | |
| 2011/0072430 A1 | 3/2011 | Mani | |

OTHER PUBLICATIONS

Timothy Bisson, Scott A. Brandt, Darrell D.E. Long, "A Hybrid Disk-Aware Spin-Down Algorithm with I/O Subsystem Support," Performance, Computing, and Communication Conference, 2007. IPCCC2007, IEEE International, pp. 236-245, Apr. 11-13, 2007.

Wang, An-I, Andy, et al., "The Conquest File System: Better Performance Through a Disk/Persistent-RAM Hybrid Design". ACM Transactions on Storage, vol. 2, No. 3, Aug. 2006, 309-348.

Bisson, Timothy and Scott A. Brandt. "Reducing Hybrid Disk Write Latency with Flash-Backed i/o Requests." Modeling, Analysis, and Simulation of Computer and Telecommunication Systems, 2007. MASCOTS'07, 15$^{th}$ International Symposium on. IEEE, 2007.

Bisson, T.; Brandt, S.A.; Long, D.D.E, "NVCache: Increasing the Effectiveness of Disk Spin-Down Algorithms with Caching, "Modeling, Analysis, and Simulation of Computer and Telecommunication Systems, 2006.MASCOTS 2006. 14$^{th}$ IEEE International Symposium on, pp. 422,432, Sep. 11-14, 2006.

Young-Jin Kim; Sung-Jin Lee; Kangwon Zhang; Jihong Kim, "I/O Performance Optimization Techniques for Hybrid Hard Disk-Based Mobile Consumer Devices," Consumer Electronics, IEEE Transactions on, vol. 53, No. 4, pp. 1469, 1476, Nov. 2007.

* cited by examiner

OPTIMIZED B-TREE

BACKGROUND

1. Technical Field

The present disclosure relates to b-trees and more specifically to concurrent access of b-trees.

2. Introduction

Computers are relied upon to store and offer access to large amounts of data. Accordingly, being able to access the data faster and more efficiently is an ongoing goal of modern developers. To achieve this goal, computing data structures have been developed to achieve this end.

One data structure which has been commonly used to manage data is a binary tree. Binary trees store data in nodes connected in a tree structure. Each tree begins with a single root node that stores a single data element and can have no more than two child nodes. The child nodes are commonly referred to as the left child and right child. Each child node can likewise store one data element and have two child nodes. Data is stored in a binary tree using the value in each node as a key. For example, if a binary tree holds integers as values, the tree is organized such that each integer is stored in a node to the left of a node containing a larger integer, but to the right of a node containing a smaller integer. This way the contents of each node of the tree can be used as a key to quickly traverse the tree and find data.

Many variations of the binary tree have been developed. One variation that is commonly used when managing very large amounts of data is a b-tree. As known to a person of ordinary skill in the art, a B-tree (referred to as "b-tree" throughout this document) is a variation of the binary tree that allows for multiple keys and children per node. Some b-trees can be configured to have hundreds of keys and children per node, thus having millions of nodes in a tree with a fairly short depth. These types of large b-trees are commonly used by file-systems to represent files and directories.

One variation of a b-tree has been developed by Ohad Rodeh and has been disclosed in his paper B-trees, Shadowing, and Clones (ACM Transactions on Computational Logic, Vol. V, No. N, August 2007), which is incorporated by reference, herein, in its entirety.

To increase the speed and efficiency of accessing data within a b-tree, concurrent access to a tree can be granted to multiple functions. Granting concurrent access, however, can lead to errors if a node is modified while being accessed by another node. To alleviate this problem, multiple locking schemes have been used to limit errors while allowing as much concurrent access as possible.

In the past, different types of locks, providing different levels of security, have been used. For example, functions have been differentiated between functions that modify the tree (write function) versus those that only request data from the tree (read function) and different types of locks have been configured to restrict access from certain types of functions attempting to access a node. For example, when a read function accesses a node, a read lock can be placed on the node which allows only other read functions to access the node concurrently and restricts access to all write functions. When a write function accesses a node, a write lock can be placed which restricts access to all other functions, both read and write.

One common solution to allowing concurrent access to a b-tree is to lock each node as it is traversed by the function. For example, in some embodiments, for every node traversed by a read function, a read lock is applied to the node. Conversely, for every node traversed by a write function a write lock can be applied to the node. This solution, although effective, is inefficient and slow because each function must enter the tree by the root node and so the root node must always be locked when the tree is accessed by a function. In the case of a write function, the result is that no other functions can access the tree until the write function has completed and the lock is removed.

To remedy this problem, the b-tree disclosed by Ohad Rodeh incorporates a lock coupling technique wherein individual nodes are locked as they are traversed and can then be released after the appropriate child node is locked if it is determined that the parent node will not be modified. Similar to the method described above, a read lock is used when the tree is traversed by a read function while a write lock is used when the tree is traversed by a write function.

The lock coupling method is beneficial because a node is not locked unless it is being accessed, or it is likely that the node will be modified. The root node, therefore, is often not locked when the tree is accessed by a function and the tree can therefore be accessed by both reader and writer functions concurrently.

Lock coupling does provide a more efficient system of allowing concurrent access to a tree; however the restrictive nature of a write lock still fails to allow sufficient concurrent access and ultimately impedes performance. Accordingly, a need exists for a less restrictive locking technique associated with concurrent access to b-trees that still provides adequate protection against errors.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for an optimized b-tree. To provide faster and more efficient concurrent access to a b-tree, a read lock can be applied to traversed nodes of a b-tree in a lock coupling fashion regardless of whether a function is a read or write function. A read locked node can be promoted to a write locked node upon a determination that the node is likely to be modified.

A promote function can be configured to lock a node to restrict further functions from accessing the node while allowing any functions currently accessing the node to remain. Once all other functions accessing the node have left, the promote function can be configured to apply a write lock to the node. If, while waiting for the other functions accessing the node to leave, one attempts to promote, the promote can be granted on a first come first serve basis. The second function attempting to promote can receive an error and retry its traversal from the root of the tree.

A node can be promoted upon a determination that the node is likely to be modified. A determination that a node is likely to be modified can be based on numerous factors. For example, the determination can be made based on the type of function or whether the node is a leaf node. In some embodiments, the tree can be configured to proactively merge or split nodes as they are traversed based on the number of keys in the node. For example, all nodes at a maximum capacity can be split or rebalanced and all nodes at a minimum capacity can be merged or rebalanced with its sibling nodes. The number of keys in the node can then be used to determine that a node is likely to be split. This can also be applied to a parent node. A child node that needs to be split or rebalanced can require the parent node be modified, so the number of keys in a child node can be used to determine that the parent node is likely to be modified as well.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
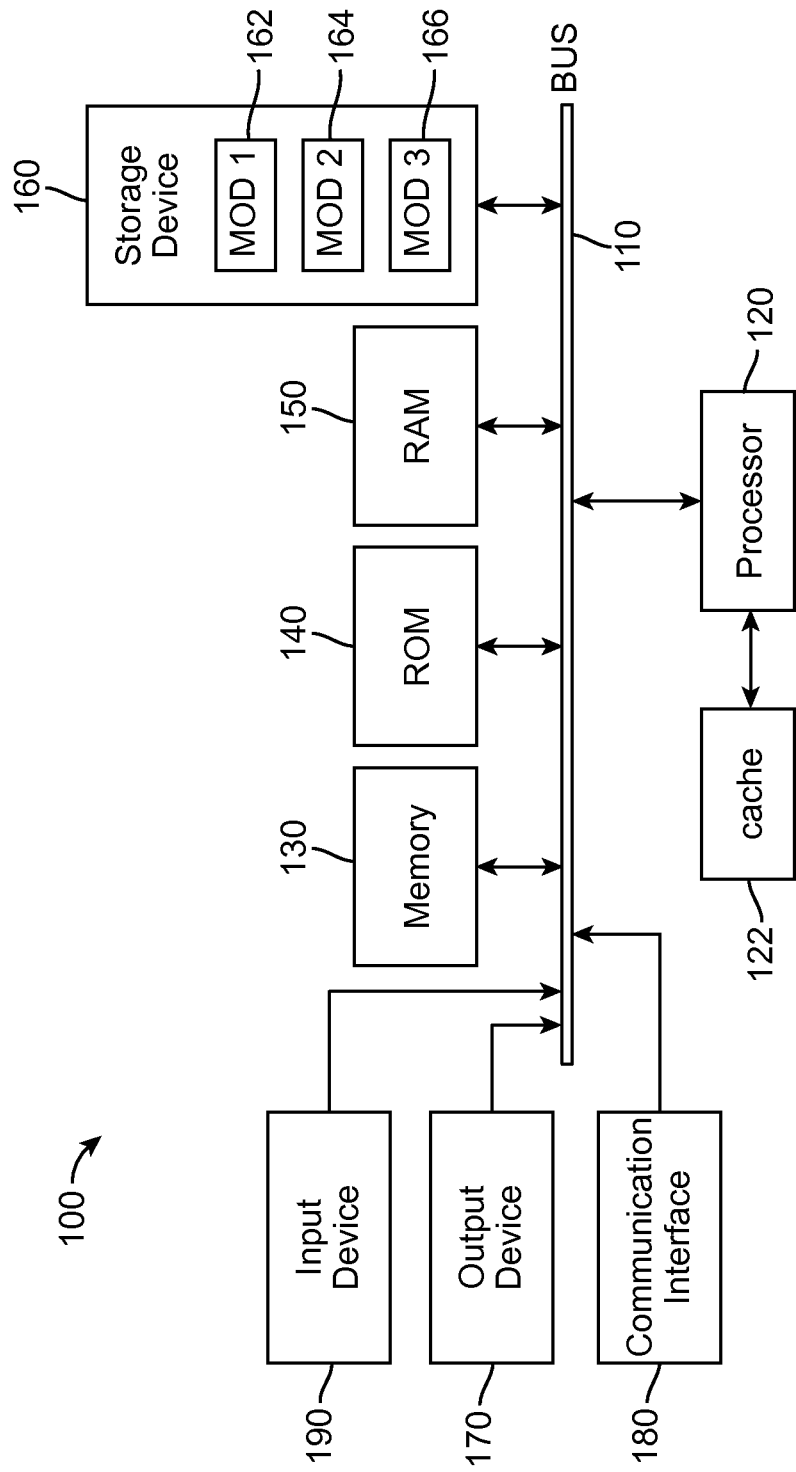
FIG. 1 illustrates an example system embodiment.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive, solid state drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.)

Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

As is commonly known in the art, a b-tree is a tree data structure that keeps data sorted and allows searches, access, insertions and deletions very quickly. The b-tree is a variation of a binary search tree in which each node can contain multiple keys and have more than two children. Although each node has a maximum number of allowable keys and children, the number of keys and children per node can be variable as long as they do not exceed the maximum limit. The number of allowable keys and children per node can be variable, however they should consistently correspond to each other. For example, in some embodiments the tree can be configured so that if each node can contain X keys, the node can have X+1 children. In some embodiments, the tree can be configured so that if each node contains X keys, the node can have X children.

When accessing a b-tree, all functions must enter from the root node and traverse the tree accordingly. To quickly search the tree, the keys within a node are used as a guide. The b-tree is configured so that the value of all keys stored in a child node is within the range of the key to its left and right in the parent node.

The key values are used as guides to traversing the tree, but in some embodiments, the actual data stored in the tree is stored in leaf nodes. The leaf nodes are the nodes at the lowest level of the tree and do not have children.

A b-tree is kept balanced by requiring that all leaf nodes are at the same depth, meaning that they are all an equal distance from the root node. To maintain this balance, nodes are split and merged as keys are added and removed from the tree. To perform split and merge functions efficiently, the number of keys allowed per internal node can be configured to be within a predetermined range. For example, each node can be required to have within b and 2b+1 keys, where b>=2. These ranges allow the tree to be easily split into two and merged into one. The root node does not need to follow these guidelines and can have, for example, between 0 and 2b+1 keys.

Figure 2A:
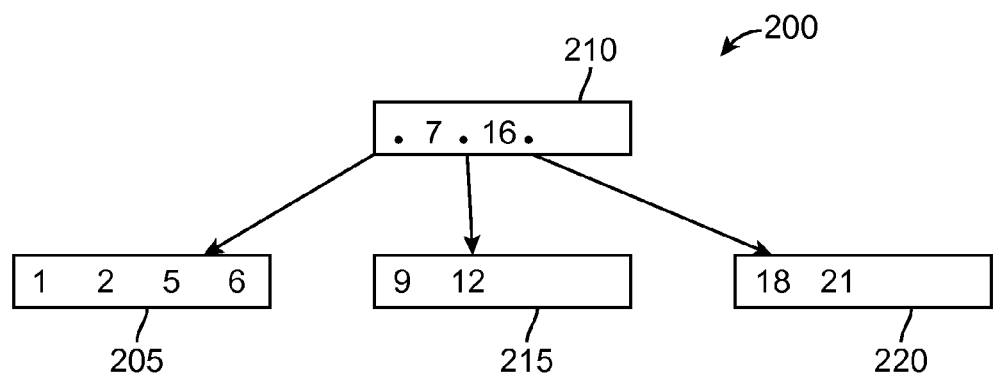
FIGS. 2a and 2b illustrate an exemplary b-tree.

FIG. 2a illustrates an exemplary b-tree. As illustrated, the b-tree 200 is configured so that each node can hold up to 4 keys and have up to 5 children. The illustrated b-tree is configured to hold integers and, integers are the key used to navigate the tree. The data is sorted so that all integers stored in the tree are positioned to the right of all smaller integers and to the left of all larger integers. To accomplish this, the tree can be configured so that keys stored in a node are always equal or greater than the value of the key to its left in the parent node and less than the value of the key to its right in its parent node.

For example, as illustrated, the leftmost child node 205 of the root node 210 is ordered smallest to largest, left to right, and contains only integers smaller than 7, which is the key to its right in the root node 210. The middle child node 215 contains only integers equal to or larger than 7, which is the key to its left in the root node 210, and smaller than 16, which is the key to its right in the root node 210. Finally, the rightmost child node 220 only contains integers equal to or larger than 16, which is the key to its left in the root node 210.

When adding data to the b-tree 200, the tree can be configured to rearrange itself to conform to the rules of the tree. For example, if the integer 3 is added to the illustrated tree, the leftmost child 205 would exceed the maximum of 4 allowable keys. To remedy this problem, the root node 210 can be modified to add an extra key and the leftmost child node 205 can be split into two nodes.

Figure 2B:
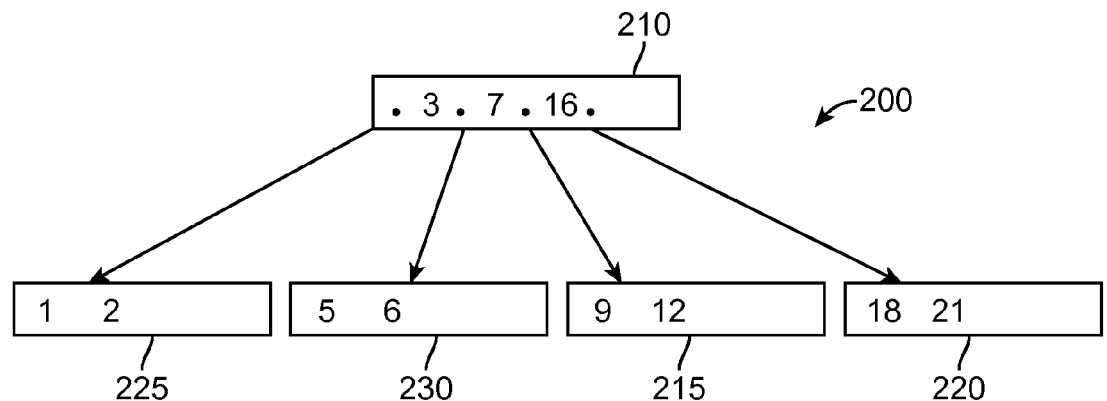

FIG. 2b illustrates the b-tree of FIG. 2a with the number 3 added. As illustrated, the root node 210 can be modified to include the number 3 and the leftmost child 205 can be split into two separate nodes, one placed to the left 225 of the key 3 in the root node 210 and one placed between 230 the keys 3 and 7 in the root node 210. The keys within the two modified child nodes 225 and 230 correspond to the rules of the tree that the keys in the child must be equal or greater than the value of the key to its left in its parent node and less than the value of the key to its right in its parent node.

To increase the speed at which users can access the data in the tree, concurrent access to the tree can be granted to multiple functions. Concurrent access, however, can lead to errors if, for example, a node of the tree is modified while another function is attempting to access the data.

To alleviate this problem, when a node is accessed by a function, a lock can be placed on the node to restrict other functions from accessing the node until the lock has been removed.

In some embodiments, different types of locks can be used, the different locks providing different levels of security. For example, functions can be differentiated between functions that modify the tree versus those that only request data from the tree. A function that modifies the tree can be called a write function because it alters the tree and thus writes to it in some way, for example by adding or deleting data. A function that merely request data can be called a read function because data is only read and the tree is not modified.

Different types of locks can be configured to restrict access to a node from certain types of functions. For example, allowing access to multiple read functions at the same time poses no threat of error because a read function does not modify the tree, whereas a write function poses a threat of error since at least one node will be modified. Accordingly, when a read function accesses a node, a lock can be placed to allow only other read functions to access the node concurrently by restricting access to all write functions. This type of lock can be called a read lock. When a write function accesses a node, a lock can be placed on the node which restricts access to all other functions, both read and write, to protect against error. This type of lock can be called a write lock.

One common solution to allowing concurrent access to a b-tree is to lock each node as it is traversed by the function.

For example, in some embodiments, for every node traversed by a read function, a read lock is applied to the node. Conversely, for every node traversed by a write function, a write lock can be applied to the node. The locks applied can be removed upon the function completing. Removing a lock applies only to the lock placed by that function, locks placed on a node by a different function are not affected.

This solution, although effective, can be inefficient because each function must enter the tree by the root node and so the root node must always be locked when the tree is accessed by a function. In the case of a write function, the result is that no other functions can access the tree until the write function has completed and the lock is removed.

To remedy this problem, a lock coupling technique can be used wherein individual nodes are locked as they are traversed and can then be released after the appropriate child node is locked if it is determined that it is not likely that the parent node will be modified. Similar to the method described above, a read lock can be used when the tree is traversed by a read function while a write lock can be used when the tree is traversed by a write function.

The lock coupling method is beneficial because a node is not locked unless it is being accessed by a read or write function, or it is likely that the node will be modified. The root node, therefore, is often not locked when the tree is accessed by a function and the tree can therefore be accessed by both reader and writer functions concurrently.

Lock coupling does provide a more efficient system of allowing concurrent access to a tree; however the restrictive nature of a write lock can still lead to inefficiencies. For example, a write function ultimately does write to a tree, but the function is only reading the keys of a tree while it is traversing and only writes at the end of its search. Accordingly, a write function is only a read function until it is determined that a node is likely to be modified and thus can be treated as a read function until that time. Therefore, there is no need for nodes to be write locked when traversed by a write function unless there is a determination that the node is likely to be modified and there is no need to restrict a write function from a read locked node unless the node is being modified. By only read locking a node as it is traversed by a write function and treating a write function as a read function until it is ready to modify the tree, efficiency can be greatly increased. Using this system, all functions can have access to a node unless the node is likely to be modified.

Many factors can go into determining whether a node is likely to be modified. For example, the type of function can be a factor. A read function only reads data from the tree and does not modify it, so when being accessed by a read function, a node is never likely to be modified. Another factor can be whether a node is a leaf node. If a write function has traversed the tree until it has reached a leaf node, the node is likely to be modified because data is stored in the leaf nodes. Another factor can be the number of keys or keys in a node. For example, returning to FIG. 2a, the leftmost node 205 contains 4 keys, which is the node's maximum capacity. If a function is going to add a key to the node 205, it can be determined to be likely that both the leftmost node 205 as well as the parent node 210 are likely to be modified because the leftmost node is at full capacity and thus requires a split or rebalancing.

This same concept can be applied to b-trees configured to perform a pro-active split or pro-active merge when inserting or removing a key. For example, in some embodiments a b-tree can be configured so that when a write function traverses a tree to insert a key, each full node is split or rebalanced. Both a node and a parent node can be determined to be likely to be modified if the node is full. The same proactive policy can be implemented when a write function wishes to remove a key from the tree. The function can be configured to merge or rebalance nodes with a minimal amount of keys. For example, a tree configured to allow between b and 2b+1 keys per node will merge all nodes with b keys when performing a remove function and split all nodes with 2b+1 keys when performing an insert function. In either case, both the node and the parent node can be determined to be likely to be modified.

Upon a determination that a node is likely to be modified, a promote function can be utilized to promote a read locked node to a write locked node. If multiple functions are accessing a node when one function wishes to promote the lock on the node from read to write, the promote function can be configured to first lock the node from new functions wishing to access the node and then wait until all existing functions accessing the node have left before promoting the lock from a read lock to a write lock.

If one of the other functions attempts to promote to a write function, priority can be given on a first in order system. For example, in some embodiments, the first function to attempt to promote will be given priority and granted the promote, while any other functions attempting to promote can be canceled and removed from the tree. The removed functions can then try to re-access the tree. The likelihood that two functions will attempt to promote at the same time is highly unlikely. This low probability is used advantageously to increase concurrent access to the tree by planning for a possible failure for one function. This represents a major philosophical difference over previous methods in that the chance of failure is allowed to increase overall efficiency.

Figure 3:
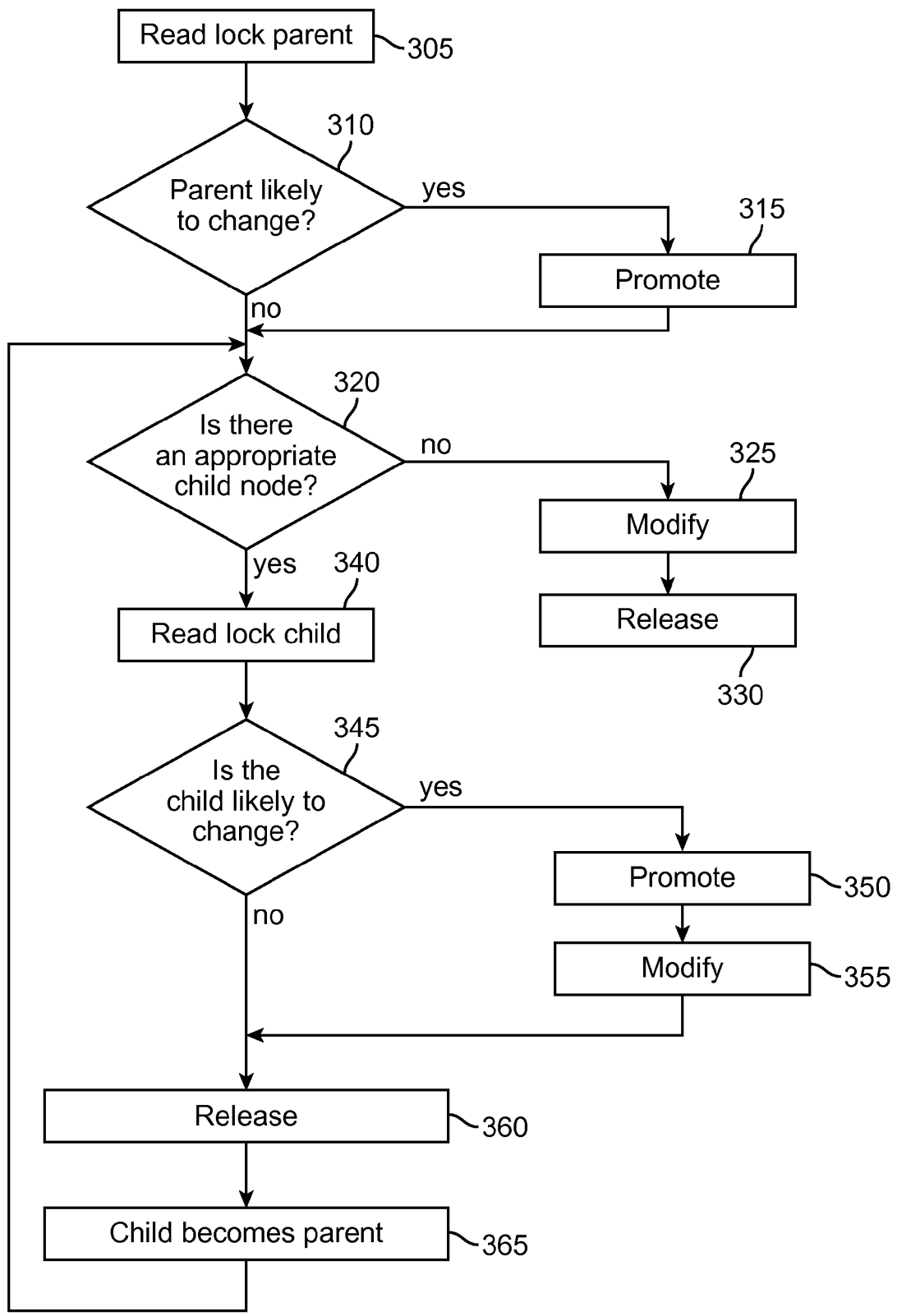
FIG. 3 illustrates an exemplary method embodiment of using a promote function in a b-tree.

FIG. 3 illustrates an exemplary method embodiment of using a promote function in a b-tree. As illustrated when a function accesses the tree, the method first read locks the root node 305, which is then assigned as the parent node in this method.

The method then determines whether the parent node is likely to change 310. This determination can be made in any number of ways. For example, it can be determined that the parent node is likely to be changed if there is no appropriate child node for the function to continue to, or the number of keys in the node is outside of a set range. For example, in some embodiments, a b-tree can be configured to proactively split or merge and so any node with a number of keys outside of a predetermined range can be configured to be modified appropriately.

If it is determined that the parent is likely to change 310, the promote function (described in further detail in FIG. 4) promotes 315 the read lock to a write lock. The method then determines whether there is an appropriate child node 320. If there is no child node, the method continues to 325 where the function modifies 325 any node which is write locked by the function and then releases all locks 330 placed by the function.

If at 320 an appropriate child node is found, the method can read lock 340 the appropriate child node. The method can then determine whether the child node is likely to change 345. If the child node is not likely to change, the lock on the parent node is released 360 and the child node is then designated as the parent node 365. The method then returns to step 320.

If at 345 it is determined that the child node is likely to change, the method promotes 350 (FIG. 4) the read lock on the child, parent or appropriate sibling nodes and modifies 355 the write locked nodes accordingly. The method then continues to step 360 where the write lock on the nodes are released 360 and the child node becomes designated as the parent node 365.

Figure 4:
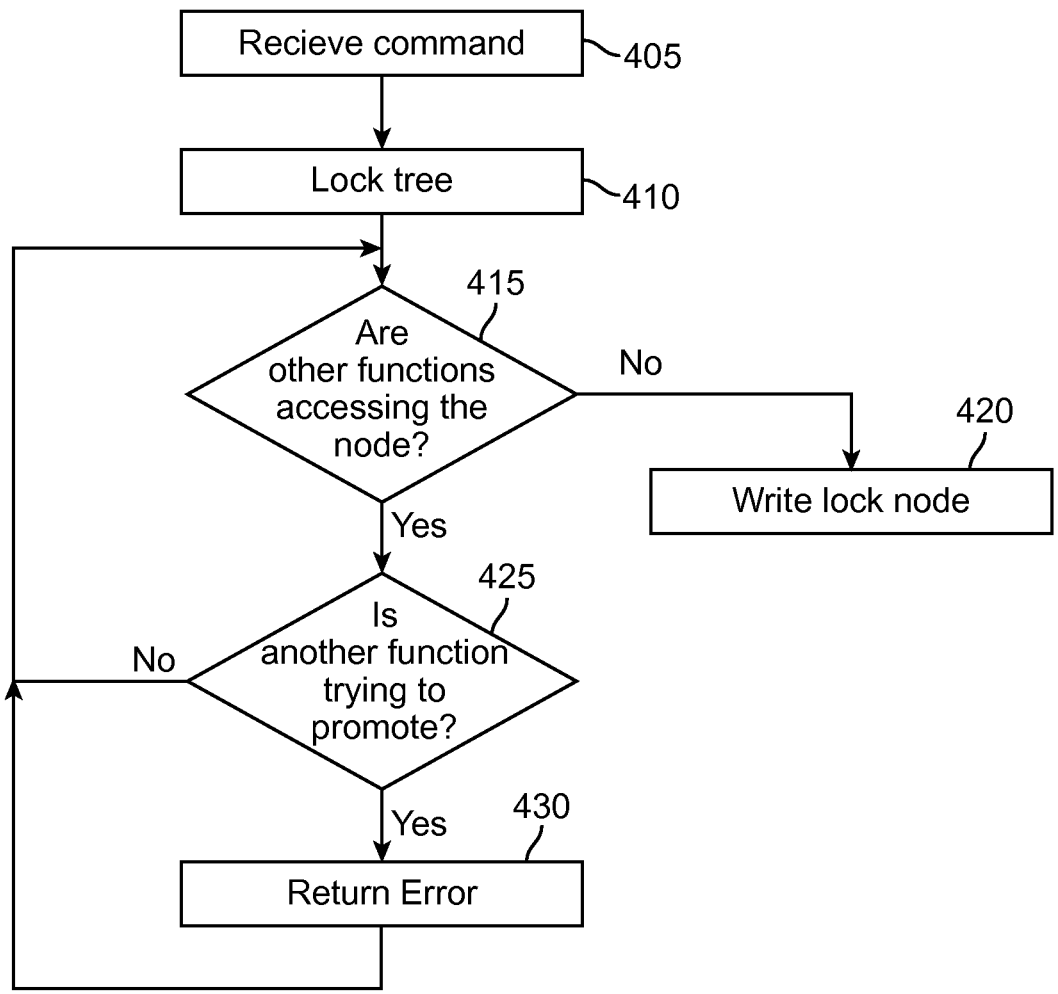
FIG. 4 illustrates an exemplary method embodiment of the promote function.

FIG. 4 illustrates an exemplary method embodiment of the promote function. As illustrated, upon receiving the command to promote 405, the method first applies a lock to the node 410. This lock can be similar to a write lock in that it prohibits all read and write functions from accessing the node. The lock, however, can be configured to not affect the functions that were already accessing the node at the time the promote function was executed.

The method next determines whether any other functions are accessing the node 415. If no other functions are accessing the node, the lock on the node is promoted 420 from a read lock to a write lock.

If other functions are accessing the node, the method determines whether one of those functions is requesting to promote 425. If one of the other functions is requesting to promote, other function will be denied and the promote will return and error 430. Upon receiving an error, the denied function can try to re-access the tree from the root node.

If at 425 the method determines that a function is not trying to promote, the method returns to step 415.

Figure 5:
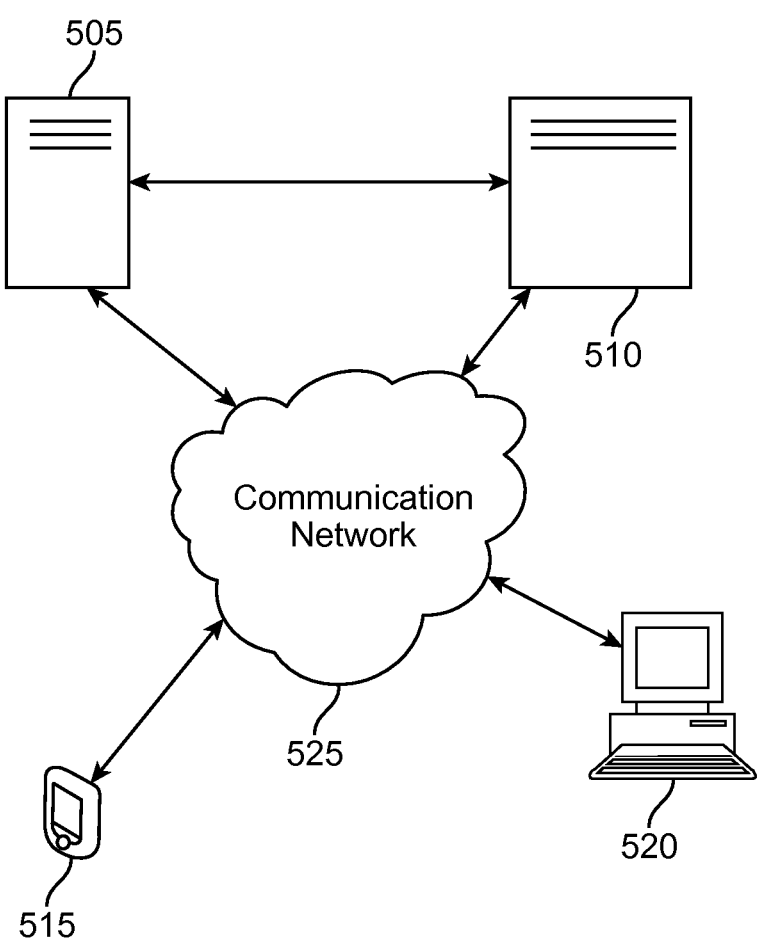
FIG. 5 illustrates an exemplary system embodiment in which an optimized b-tree can be implemented.

FIG. 5 illustrates an exemplary system embodiment in which an optimized b-tree can be implemented. As illustrated, servers 505 510, user devices 515 and personal computers 520 can be configured to communicate with each other directly or through use of a communications network 525. Although certain types of computing devices are illustrated, this is only for exemplary purposes; any type of computing devices can be used. An optimized b-tree can be implemented on any or all of the user devices.

An optimized b-tree can be used to store any type of data for any purpose. For example, an optimized b-tree can be used as a file system to represent files and directories. This type of embodiment can be implemented on any of the devices and accessed from any of the devices. For example, server 505 can implement an optimized b-tree as a file system. Server 505 can be configured to be in direct communication with server 510 so that a function running on server 510 can access the optimized b-tree on server 505. Alternatively, user device 515 can access server 505 via the communications network 525 and access the optimized b-tree by accessing files stored on server 505. Personal computer 520 can likewise access server 505 via the communications network to read or write files stored in the optimized b-tree.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, solid state drive, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A computer implemented method comprising:
upon a request by a first function to access data stored in a node of a B-tree based file system, applying a read lock to the node, wherein the read lock is applied when the first function is a write function;
after applying the read lock, determining whether the node is to be modified by the first function based on at least one of a type of the first function, a type of the node, or a number of keys in the node;
upon determining that the node is to be modified by the first function, promoting the read lock applied for the first function to a write lock using a promote function, the promote function to apply a lock to the node to restrict access to the node by additional functions without restricting access to functions having existing access to the node and to apply the write lock to the node once the first function has sole access to the node;
proactively merging or rebalancing the node after promoting the read lock applied for the first function when the node contains at least a predetermined minimum number of keys;
proactively splitting or rebalancing the node after promoting the read lock applied for the first function when the node contains at least a predetermined maximum number of keys, wherein when the first function is a write function to traverse the B-tree based file system to insert a key, each full node traversed by the write function is split or rebalanced; and upon determining that the node is not to be modified, unlocking the node after a child node of the node is read locked upon a request by the first function.

2. The method of claim 1 further comprising determining whether the node is to be modified based on the type of the first function, wherein the first function is a write function.

3. The method of claim 1 further comprising determining whether the node is to be modified based on the type of the first function, wherein the first function is a read function.

4. The method of claim 1 further comprising determining whether the node is to be modified based on the type of the node, wherein the node is a leaf node.

5. The method of claim 1 further comprising determining whether the node is to be modified based on the type of the node, wherein the node is a parent node.

6. The method as in claim 1 further comprising while using the promote function on the read lock of the first function, determining that a second function having existing access to the node is to modify the node and returning an error to the second function.

7. A system comprising:
a data storage system to store data in a B-tree based file system;
a processing device coupled to the data storage system, the processing device configured to:
upon a request by a first function to access data stored in a node of the B-tree based file system, apply a read lock to the node, wherein the read lock is applied when the first function is a write function;
after the read lock is applied, determine whether the node is to be modified by the first function based on at least one of a type of the first function, a type of the node, or a number of keys in the node;
upon a determination that the node is to be modified by the first function, promote the read lock to a write lock with a promote function, the promote function to apply a lock to the node to restrict access to the node by additional functions and not restrict access to the node by functions having existing access, wherein the promote function is further to apply the write lock to the node once the first function has sole access to the node;
proactively merge or rebalance the node after promoting the read lock applied for the first function when the node contains at least a predetermined minimum number of keys;
proactively split or rebalance the node after promoting the read lock applied for the first function when the node contains at least a predetermined maximum number of keys, wherein when the first function is a write function to traverse the B-tree based file system to insert a key, each full node traversed by the write function is split or rebalanced; and
upon a determination that the node is not to be modified, unlock the node after a child node of the node is read locked upon a request by the first function.

8. The system of claim 7, the processing device further to determine whether the node is to be modified at least in part on the type of the first function, wherein the first function is a write function.

9. The system of claim 7, the processing device further to determine whether the node is to be modified at least in part on the type of the first function, wherein the first function is a read function.

10. The system of claim 7, the processing device further to determine whether the node is to be modified based on the type of the node, wherein the node is a leaf node.

11. The system of claim 7, the processing device further to determine whether the node is to be modified based on the type of the node, wherein the node is a parent node.

12. The system of claim 7, the processing device further to return an error to a second function that already had access to the node when it was determined that the node is to be modified by the first function upon a determination that the node is to be modified by the second function.

13. A non-transitory computer-readable medium comprising instructions, which when executed by a processing device, cause the processing device to perform a method comprising:
upon a request by a first function to access data stored in a node of a B-tree based file system, applying a read lock to the node, wherein the read lock is applied when the first function is a write function;
after applying the read lock, determining whether the node is to be modified by the first function based on at least one of a type of the first function, a type of the node, or a number of keys in the node;
upon determining that the node is to be modified, promoting the read lock to a write lock using a promote function, the promote function to apply a lock to the node to restrict access to the node by additional functions without restricting access to functions having existing access to the node and the promote function is further to apply the write lock to the node once the first function has sole access to the node;
proactively merging or rebalancing the node after promoting the read lock applied for the first function when the node contains at least a predetermined minimum number of keys;
proactively splitting or rebalancing the node after promoting the read lock applied for the first function when the node contains at least a predetermined maximum number of keys, wherein when the first function is a write function to traverse the B-tree based file system to insert a key, each full node traversed by the write function is split or rebalanced; and
upon determining that the node is not to be modified, unlocking the node after a child node of the node is read locked upon a request by the first function.

14. The medium as in claim 13 further comprising determining whether the node is to be modified based on the type of the first function, wherein the first function is a write function.

15. The medium as in claim 13 further comprising determining whether the node is to be modified based on the type of the first function, wherein the first function is a read function.

16. The medium as in claim 13 further comprising determining whether the node is to be modified based on the type of the node, wherein the node is a leaf node.

17. The medium as in claim 13 further comprising determining whether the node is to be modified based on the type of the node, wherein the node is a parent node.

18. The medium as in claim 13 further comprising while using the promote function on the read lock of the first function, determining that a second function having existing access to the node is to modify the node and returning an error to the second function.

* * * * *